US006464234B2

(12) United States Patent

Frauhammer et al.

(10) Patent No.: US 6,464,234 B2

(45) Date of Patent: Oct. 15, 2002

(54) MACHINE TOOL, ESPECIALLY A HAMMER DRILL OR CHISEL

(75) Inventors: Karl Frauhammer; Manfred Hellbach, both of Leinfelden-Echterdingen; Heinz Schnerring, Dettenhausen; Karsten Blaier, Friedrichshafen/Bodensee, all of (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 09/759,840

(22) Filed: Jan. 11, 2001

(65) Prior Publication Data

US 2001/0013682 A1 Aug. 16, 2001

(30) Foreign Application Priority Data

Jan. 14, 2000 (DE) ........................................ 100 01 191

(51) Int. Cl.[7] ................................................ B23B 45/16

(52) U.S. Cl. ......................................... 279/19.4; 279/75

(58) Field of Search .......................... 279/19.4, 75, 904

(56) References Cited

U.S. PATENT DOCUMENTS

| | | | | | |
|---|---|---|---|---|---|
| 1,346,341 | A | * | 7/1920 | Schinkez | 279/19.4 |
| 1,618,851 | A | * | 2/1927 | Thurnberg et al. | 24/652 |
| 4,878,679 | A | * | 11/1989 | Plank et al. | 279/126 |
| 5,709,391 | A | | 1/1998 | Arakawa et al. | |
| 2001/0013682 | A1 | * | 1/2001 | Frauhammer et al. | 279/19.4 |
| 2001/0017447 | A1 | * | 2/2001 | Baumann et al. | 279/19.4 |

FOREIGN PATENT DOCUMENTS

| | | | | |
|---|---|---|---|---|
| DE | 3419465 | * | 11/1985 | 279/19.4 |
| DE | 35 16 541 A1 | | 11/1986 | |
| DE | 3828309 | * | 2/1990 | 279/19.4 |
| DE | 197 55 364 A1 | | 6/1998 | |
| EP | 0 456 003 B1 | | 2/1995 | |
| FR | 1193303 | * | 11/1959 | 279/75 |
| SU | 1105878 | * | 7/1984 | 279/75 |
| SU | 1138795 | * | 2/1985 | 279/75 |

* cited by examiner

*Primary Examiner*—Raleigh W. Chiu

(74) *Attorney, Agent, or Firm*—Michael J. Striker

(57) ABSTRACT

The machine tool, especially a hammer drill or chisel, has a rotatable and/or axially movable tool holder (10,12) for a tool (16) having a grooved shaft. The tool holder (10,12) includes a base body (22); two radially movable locking bodies (18,20) held in the base body and movable into respective locking positions engaged in two closed grooves (26,28) in the tool shaft; a bearing member (32) movable between a bearing position for holding the locking bodies (18,20) in the locking position and a releasing position in which the locking bodies are movable out of the grooves; an operating member (36,38) connected with the bearing member (32) for moving the bearing member (32) and a resilient plastic guiding member (42,44) arranged to guide the locking bodies (18,20) radially outward during motion from the locking to unlocking position and to act on the locking bodies (18,20) with a radially inwardly directed spring force.

11 Claims, 2 Drawing Sheets

MACHINE TOOL, ESPECIALLY A HAMMER DRILL OR CHISEL

BACKGROUND OF THE INVENTION

The present invention relates to a machine tool, especially a hammer drill or chisel hammer or chipping hammer, and, more particularly, to a machine tool having a rotatably driven and/or hammering tool holder for receiving a tool with a grooved shaft, which has a base body with at least one radially movable locking body, which engages in a closed groove in one end of a shaft of a tool held in the tool holder and which is retained in a locking position by a releasable bearing member, which may be moved into a releasing position in which the locking body is radially released so that it can move into its unlocking position by means of an operating element.

A hammer drill machine with a rotatably driven tool holder is disclosed in EP 0 456 003 B1. The tool holder has a base body and a receptacle arranged in it for a drill or a hammer tool, in which a chuck with jaws acting as a first tool-holding means and a special second tool-holding means for a tool provided with a grooved shaft are arranged. The special second tool receptacle has a radially slidable locking element in the form of a locking ball, which is movable into a closed groove on a shaft end of the tool and which is held in its locking position by a retaining or bearing sleeve and a locking sleeve having limited axial movability. The locking sleeve is spring-loaded so as to be urged over the retaining sleeve in the direction of its holding position. In the locking position of the locking ball the locking sleeve radially overlaps the locking ball and the retaining sleeve locks the locking ball with an axially projecting portion.

When the tool is inserted the locking ball is pushed into a longitudinal slot in the insertion direction by the shaft end of the tool. Thus the projecting portion of the retaining sleeve is pushed against the spring by means of the locking ball. A free space, in which the locking ball can escape radially to the outside, arises between the locking sleeve and the retaining sleeve. The tool can be inserted. Subsequently the pre-compressed spring slides the locking sleeve into its initial position and presses the locking ball in the grove of the tool.

To take the tool out of the tool holder the locking sleeve is pushed against the retaining sleeve with an operating element and against the spring loading the retaining sleeve, so that the locking ball can radially escape to the outside and the tool can be removed. After that the spring forces the retaining sleeve, the locking sleeve and the locking ball back into their initial position.

SUMMARY OF THE INVENTION

It is an object of the present invention to provide an improved machine tool.

This object, and others which will be made more apparent hereinafter, are attained in a machine tool having a rotatably driven and/or axially movable tool holder for receiving a tool with a grooved shaft, which comprises a base body with at least one radially movable locking body, which engages in at least one closed groove in one end of a shaft of a tool held in the tool holder and which is retained in a respective locking position by a releasable bearing member, which may be moved into a releasing position, in which the locking member is radially released, by means of an operating member.

According to the invention the tool holder has a guiding member arranged to guide the at least one locking body radially outward during motion from the locking to the unlocking position when the releasable bearing member is in the releasing position. The guiding member acts on the at least one locking body under a radially inwardly directed spring force. Tipping and tilting of the at least one locking body is thus prevented by the guiding spring force and axial motion of the at least one locking body is not required.

In preferred embodiments of the invention the radially inwardly directed spring force can be produced by one or more separate spring elements acting on the guiding member. Advantageously in a particularly preferred embodiment the guiding member or structural element is elastically deformable or resilient. The required spring force can then be produced at least partially, preferably completely, by the guiding member itself. These preferred embodiments have a reduced number of components, take up less space and have reduced assembly costs in comparison to other embodiments.

The guiding member can comprise any of a number of different elastic materials, which appear to be significant to one skilled in the art. These elastic materials include metal and plastic. The plastic guiding members, however, are particularly light and economical.

Furthermore the guiding member can have a variety of different shapes. For example, it can be ring-shaped, bar-shaped, etc, and can be compressible rubber packing, an elastic rubber or plastic bar, etc. If the guiding member is in the form of a sleeve, it can be easily assembled because of its rotational symmetry. Assembly errors can thus be avoided.

In order to save space and additional components, the operating member is guided in its motion by means of the guiding member and/or the guiding member is made in one piece with the operating member.

The locking bodies can have different shapes. For example, they can be square, spherical or take some other shape that appears significant to one skilled in the art. However if the locking body is shaped like a roll or roller, economical standardized parts result. Rolls or rollers have large transmission surfaces in their rotation directions. Torque transmission elements can be replaced or at least advantageously assisted by the rolls or rollers.

In a particularly preferred embodiment of the invention at least one portion of the tool holder is mounted axially slidable for producing an idle connection or drive connection and the locking body has a length substantially equal to that of the groove in the tool. By guiding the locking body by means of the spring force the locking body advantageously can be guided radially to the outside without axial motion. The locking body can have the maximum length and a maximum torque transmission can be obtained from this locking body. Large transmission surfaces in the rotation direction, small surface pressing values, smaller wear and longer service life can be attained for the locking body and the torque transmission elements.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
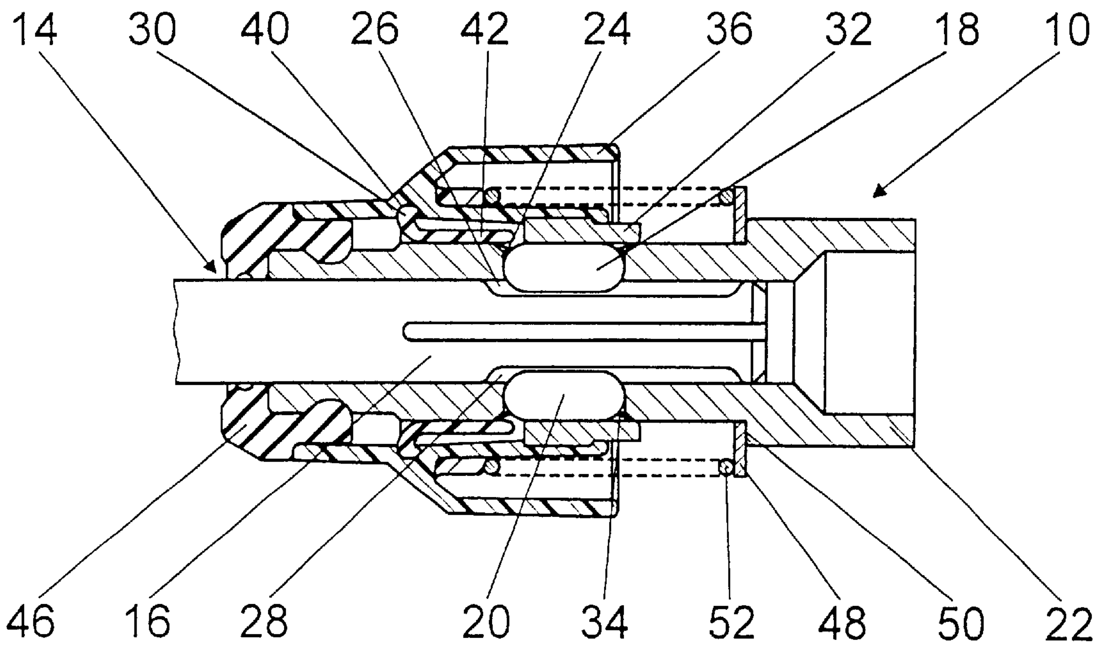
FIG. 1 is a longitudinal cross-sectional view through a first embodiment of a tool holder according to the invention in a locked state.

FIG. 1 shows a rotatably driven and/or axially movable tool holder 10 of a hammer drill for receiving a tool 16, which has a base body 22 with two radially slidable locking rollers 18,20, which are arranged in cavities 24,34 in the base body 22 and are guided in respective closed grooves 26,28 in one shaft end of the tool 16. So that the locking rollers 18,20 do not fall radially inwardly out from the cavities 24,34 when the tool 16 is not present, the cavities 24,34 are tapered or narrowed in radially inward directions.

The locking rollers 18,20 are held in locking positions by a bearing member or sleeve 32 made from metal when the bearing sleeve 32 is in its holding or retaining position shown in FIG. 1. The bearing sleeve 32 is connected in an axial direction with a plastic operating sleeve 36 fitting together with it in a form-locking manner. A coil spring 52, which is braced via a ring element 48 on a shoulder 50 of the base body, which holds the bearing sleeve 32 in its holding or retaining position by means of the operating member or sleeve 36, acts on the operating sleeve 36 (FIG. 1). The operating sleeve 36 is braced or bears on a rubber cap 46 in the axial direction remote from the coil spring 52. The rubber cap 46 is attached to the base body 22 in a portion or part 14 of the base body in which the tool 16 is inserted.

Figure 2:
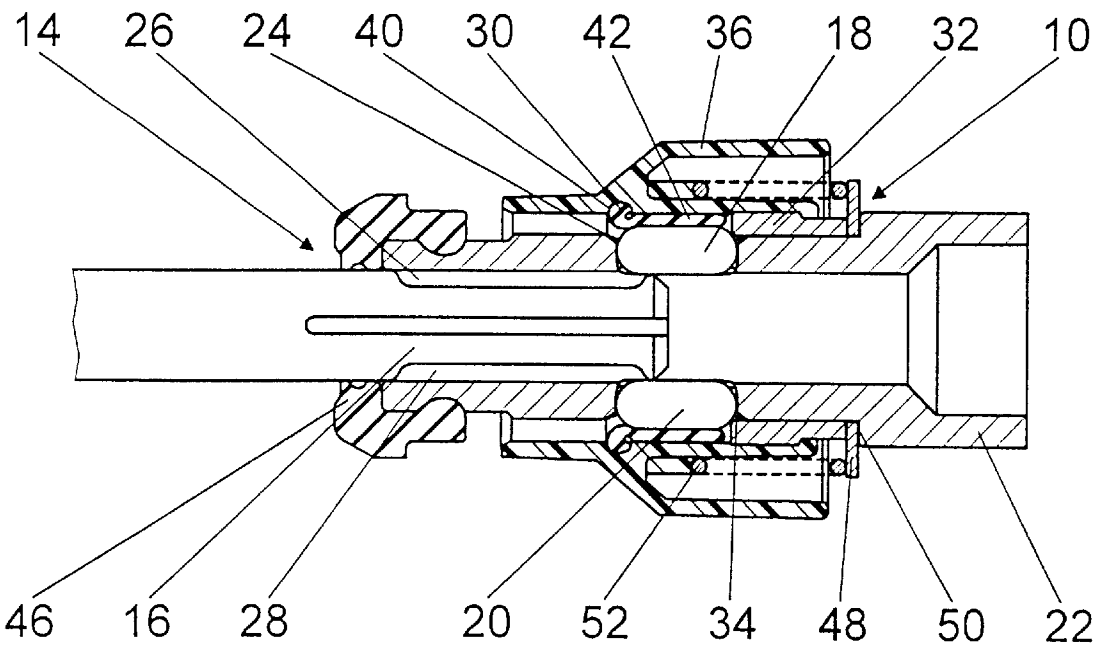
FIG. 2 is a longitudinal cross-sectional view through the tool holder shown in FIG. 1 in an unlocked state.

The bearing sleeve 32 is movable axially by means of the operating sleeve 36 into a releasing position (FIG. 2) in which the locking rollers 18,20 are radially released or freed so that that they can be disengaged from the closed grooves in the shaft of the tool 16. Indeed the operating sleeve 36 is pushed axially against the action of the coil spring 52 in a direction away from the part or portion 14 of the base body in which the tool is inserted (FIG. 2). The tool 16 can then be guided into or removed from the tool holder 10 when the bearing sleeve 32 is in the position radially releasing or freeing the locking rollers 18,20.

According to the invention the locking rollers 18,20 are radially movable toward the outside against a high temperature-resistant resilient plastic sleeve 42, which is made from an elastomeric material, by moving the tool 16 when the bearing sleeve 32 is in the releasing position in which the locking rollers 18,20 are radially released. In this embodiment the plastic sleeve 42 is the guiding member. The resilient plastic sleeve 42 urges the locking rollers 18,20 radially inward with a spring force produced by compression and guides the locking rollers 18,20 in their motions inward and outward. The resilient plastic sleeve 42 is attached to the operating sleeve with a ring-shaped projecting portion 30 at its end closest to the part 14 of the base body in which the tool is inserted. The resilient plastic sleeve 42 is located in an appropriately shaped interior cavity 40 of the operating sleeve 36.

The locking rollers 18,20 are continuously oriented with their body axes parallel to the tool axis during their motion in the radial direction. The locking rollers 18,20 are moved exclusively radially during the locking and unlocking process, i.e. without tilting or tipping. The operating sleeve 36 is guided in its axial motions by means of the resilient plastic sleeve 42.

Figure 3:
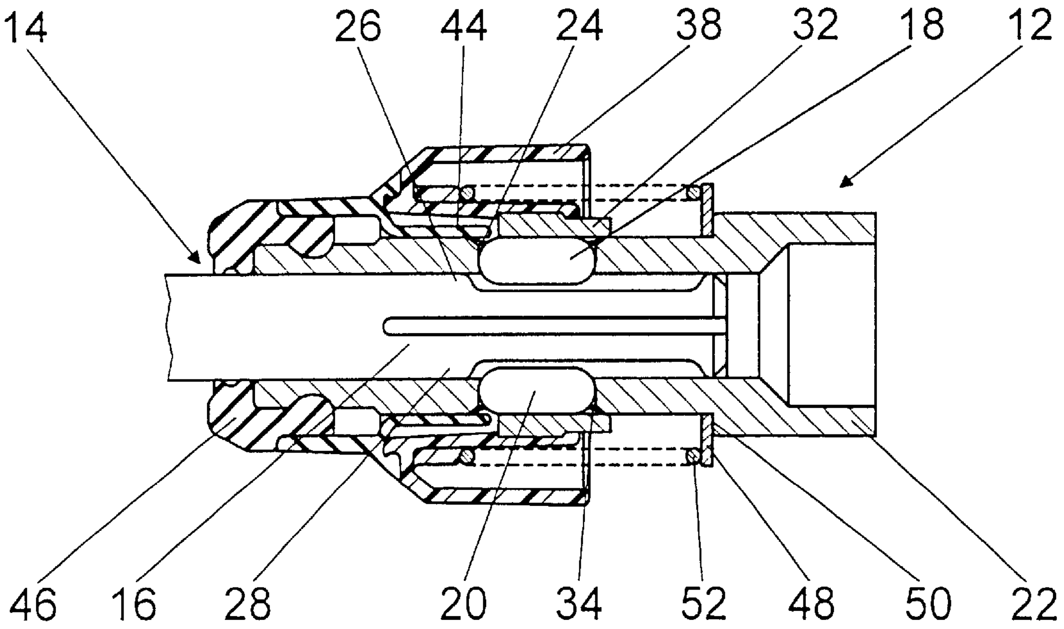
FIG. 3 is a longitudinal cross-sectional view through a second embodiment of a tool holder according to the invention in a locked state.
Figure 4:
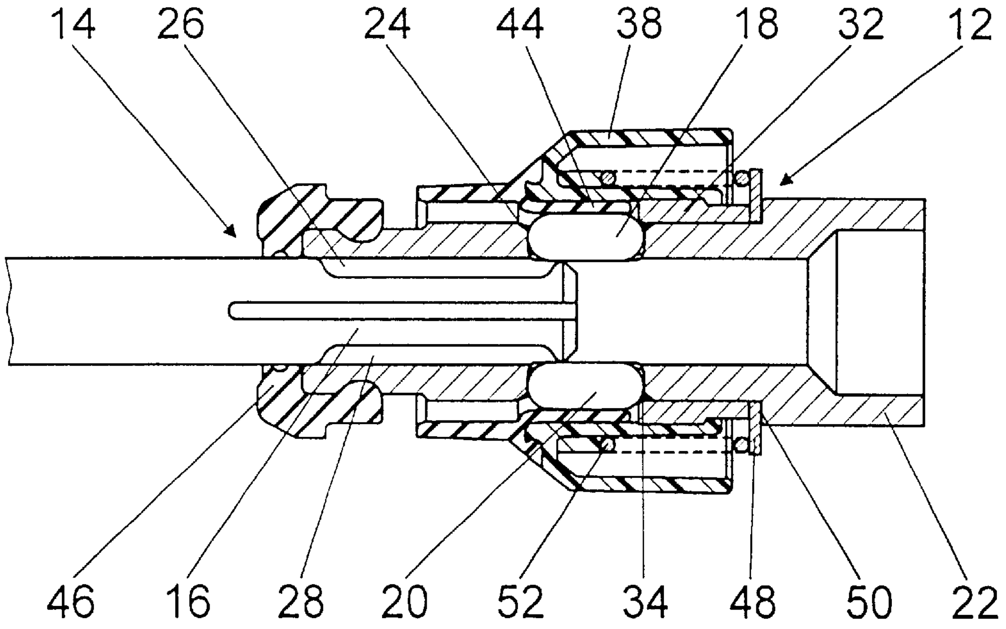
FIG. 4 is a longitudinal cross-sectional view through the tool holder shown in FIG. 3 in an unlocked state.

An additional alternative embodiment of the tool holder. 12 is shown in FIGS. 3 and 4. Parts in the embodiment of FIGS. 3 and 4, which are essentially the same as the parts shown in FIGS. 1 and 2, are given the same reference numbers in FIGS. 3 and 4. In the following the differences between the embodiments of FIGS. 1 and 2 and FIGS. 3 and 4 are pointed out. Reference is made to the description of FIGS. 1 and 2 for functions, which are the same.

The tool holder 12 shown in FIGS. 3 and 4 has a resilient plastic sleeve 44, which forms a front portion of the operating sleeve 38 and by which the operating sleeve 38 is braced in an axial direction on the rubber cap 46. The plastic sleeve 44 is attached to an axially facing side of the operating sleeve in a form-closed and material-connected manner. In other words, in this latter embodiment the operating sleeve and the guide member are in one piece.

The disclosure in German Patent Application 100 01 191.8-15 of Jan. 14, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a machine tool, especially a hammer drill or chisel, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A machine tool comprising a movable tool holder (10,12), said tool holder comprising means for receiving and holding a tool (16) having a grooved shaft provided with at least one closed groove, wherein said tool holder (10,12) including a base body (22);

at least one radially movable locking body (18,20) held in said base body (22) so as to be movable between a locking position, in which said at least one radially movable locking body is engaged in said at least one closed groove (26,28) provided in said grooved shaft of said tool (16), so that the tool (16) is retained in said tool holder (10,12), and an unlocking position, in which said at least one radially movable locking body is disengaged from said at least one closed groove (26, 28), so that the tool (16) is removable or insertable in said tool holder (10, 12);

a releasable bearing member (32) movable between a bearing position for holding said at least one radially movable locking body (18,20) in said locking position and a releasing position for releasing said at least one radially movable locking body (18,20) from said locking position, so that said at least one radially movable locking body (18,20) is movable from said locking position to said unlocking position an operating member (36,38) connected with said bearing member (32), said operating member (36,38) comprising means for moving said releasable bearing member (32) between said bearing position and said releasing position; and a guiding member (42,44) arranged to guide said at least one locking body (18,20) radially outward during motion from said locking to said unlocking position when said releasable bearing member (32) is in said releasing position and to act on said at least one locking body (18,20) under a radially inwardly directed spring force.

2. The machine tool as defined in claim 1, wherein said guiding member (42,44) is elastically deformable or resilient and provides at least a portion of said radially inwardly directed spring force.

3. The machine tool as defined in claim 1 or 2, wherein said guiding member (42,44) is plastic.

4. The machine tool as defined in claim 1, wherein said guiding member (42,44) is a sleeve.

5. The machine tool as defined in claim 1, wherein said guiding member (42,44) is a resilient plastic sleeve arranged between the operating member (36,38) and the base body (22).

6. The machine tool as defined in claim 1, wherein said guiding member (42,44) is connected with said operating member (36,38) so that said guiding member (42,44) is guided during motions thereof by said operating member.

7. The machine tool as defined in claim 1, wherein said guiding member (42,44) is in one-piece with said operating member (36,38).

8. The machine tool as defined in claim 1, wherein said at least one locking body (18,20) consists of at least one roller.

9. The machine tool as defined in claim 1, wherein said at least one locking body (18,20) consists of two rollers and said two rollers are arranged on opposite sides of said base body respectively.

10. The machine tool as defined in claim 1, consisting of a hammer drill.

11. The machine tool as defined in claim 1, consisting of a hammer chisel or chipping hammer.

* * * * *